United States Patent
Shelke et al.

(10) Patent No.: US 10,656,983 B2
(45) Date of Patent: May 19, 2020

(54) METHODS AND APPARATUS TO GENERATE A SHADOW SETUP BASED ON A CLOUD ENVIRONMENT AND UPGRADE THE SHADOW SETUP TO IDENTIFY UPGRADE-RELATED ERRORS

(71) Applicant: NICIRA, INC., Palo Alto, CA (US)

(72) Inventors: Prashant Shelke, Pune (IN); Sharwari Phadnis, Pune (IN); Kiran Bhalgat, Pune (IN); Yogesh Vhora, Pune (IN); Kartiki Kale, Pune (IN); Dipesh Bhatewara, Pune (IN)

(73) Assignee: NICIRA, INC., Palo Alto, CA (US)

( * ) Notice: Subject to any disclaimer, the term of this patent is extended or adjusted under 35 U.S.C. 154(b) by 0 days.

(21) Appl. No.: 15/805,162

(22) Filed: Nov. 7, 2017

(65) Prior Publication Data

US 2019/0026175 A1 Jan. 24, 2019

(30) Foreign Application Priority Data

Jul. 20, 2017 (IN) .............................. 201741025777

(51) Int. Cl.
| | | |
|---|---|---|
| *G06F 11/07* | (2006.01) | |
| *G05B 23/02* | (2006.01) | |
| *G06F 8/65* | (2018.01) | |
| *H04L 29/08* | (2006.01) | |
| *H04L 12/24* | (2006.01) | |
| *G06F 9/50* | (2006.01) | |

(52) U.S. Cl.
CPC ...... *G06F 11/0712* (2013.01); *G05B 23/0267* (2013.01); *G06F 8/65* (2013.01); *G06F 9/5072* (2013.01); *G06F 11/07* (2013.01); *H04L 41/145* (2013.01); *H04L 67/10* (2013.01); *H04L 67/1097* (2013.01); *H04L 67/34* (2013.01); *H04L 41/5096* (2013.01)

(58) Field of Classification Search
None
See application file for complete search history.

(56) References Cited

U.S. PATENT DOCUMENTS

| | | | |
|---|---|---|---|
| 8,171,485 B2 | 5/2012 | Muller | |
| 9,100,292 B2 * | 8/2015 | Govindarajeswaran | ..................... H04L 43/065 |
| 9,916,233 B1 * | 3/2018 | Qureshi | ............... G06F 11/3692 |
| 2003/0005235 A1 * | 1/2003 | Young | .................. G06F 11/1446 711/141 |

(Continued)

OTHER PUBLICATIONS

Ansible, "Automation for everyone," [http://www.ansible.com], retrieved on Sep. 26, 2016, 3 pages.

(Continued)

*Primary Examiner* — Wei Y Zhen
*Assistant Examiner* — Binh Luu
(74) *Attorney, Agent, or Firm* — Hanley, Flight & Zimmerman, LLC

(57) ABSTRACT

Methods and apparatus to generate a shadow setup based on a cloud environment and upgrade the shadow setup to identify upgrade-related errors are disclosed. An example apparatus includes a topology deployment determiner to deploy a shadow setup corresponding to a replica version of a live cloud environment; an upgrade coordinator to upgrade one or more components of the shadow setup; and a reporter to generate a report corresponding to the upgrade.

18 Claims, 5 Drawing Sheets

(56) References Cited

U.S. PATENT DOCUMENTS

| | | | | |
|---|---|---|---|---|
| 2003/0135478 | A1* | 7/2003 | Marshall | G06F 16/2282 |
| 2008/0276234 | A1* | 11/2008 | Taylor | G06F 8/60 |
| | | | | 717/177 |
| 2010/0138821 | A1* | 6/2010 | Driesen | G06F 8/65 |
| | | | | 717/168 |
| 2012/0151211 | A1* | 6/2012 | Kreiner | H04L 63/102 |
| | | | | 713/168 |
| 2013/0152047 | A1* | 6/2013 | Moorthi | G06F 11/368 |
| | | | | 717/124 |
| 2014/0181816 | A1 | 6/2014 | Muller et al. | |
| 2016/0092338 | A1* | 3/2016 | Henley | G06F 11/0721 |
| | | | | 717/125 |
| 2017/0091069 | A1* | 3/2017 | Fujiwara | G06F 11/368 |
| 2018/0081955 | A1* | 3/2018 | Gupta | G06F 17/30575 |
| 2018/0113728 | A1* | 4/2018 | Musani | G06F 9/455 |
| 2018/0284735 | A1* | 10/2018 | Cella | G05B 19/41875 |
| 2019/0041845 | A1* | 2/2019 | Cella | G05B 19/41875 |
| 2019/0171187 | A1* | 6/2019 | Cella | G05B 19/4155 |
| 2019/0324444 | A1* | 10/2019 | Cella | G05B 19/4184 |
| 2019/0339688 | A1* | 11/2019 | Cella | G06K 9/6263 |

OTHER PUBLICATIONS

VMware, Inc., "Using the vRealize Orchestrator Plug-In for vRealize Automation 7.1," [http://www.vmware.com/support/pubs], retrieved Sep. 26, 2016, 38 pages.

VMware, Inc., "VMware vCloud Automation Center Extensibility Overview," [http://www.vmware.com/support/pubs], Dec. 2012, retrieved Sep. 26, 2016, 15 pages.

VMware, Inc., "vRealize Code Stream Management Pack for IT DevOps: Enabling DevOps for Infrastructure" [http://www.vmware.com/support/pubs], retrieved Sep. 26, 2016, 2 pages.

VMware, Inc., "VMware vRealize Automation," [http://www.vmware.com/support/pubs], retrieved Sep. 26, 2016, 2 pages.

VMware, Inc., "vRealize Orchestrator Load Balancing: Configuration Guide Version 7.0.x and 7.1," [http://www.vmware.com/support/pubs], Aug. 2016, retrieved Sep. 26, 2016, 24 pages.

VMware, Inc., "VMware vRealize Automation: Reference Architecture Version 6.0 and Higher," [http://www.vmware.com/support/pubs],retrieved Sep. 26, 2016, 33 pages.

VMware, Inc., "IaaS Intergration for BMC Bladelogic: vRealize Automation 7.0.1," [http://www.vmware.com/support/pubs], retrieved Sep. 26, 2016, 26 pages.

VMware, Inc., "IaaS Intergration for HP Server Automation: vRealize Automation 7.0.1," [http://www.vmware.com/support/pubs], retrieved Sep. 26, 2016, 36 pages.

VMware, Inc., "Foundation and Concepts: vRealize Automation 7.1," [http://www.vmware.com/support/pubs], retrieved Sep. 26, 2016, 40 pages.

VMware, Inc., "vRealize Automation Load Balancing: Configuration Guide Version 7.1.x," [http://www.vmware.com/support/pubs], retrieved Sep. 26, 2016, 24 pages.

VMware, Inc., "Programming Guide: vRealize Automation 7.1," [http://www.vmware.com/support/pubs], retrieved Sep. 26, 2016, 366 pages.

VMware, Inc., "Reference Architecture: vRealize Automation 7.1," [http://www.vmware.com/support/pubs], retrieved Sep. 26, 2016, 46 pages.

Lazarov, "Approval Service," Nov. 18, 2015, 6 pages.
Dimitrov, "EventBroker Dev user guides," Feb. 25, 2016, 24 pages.
Savo, "Functional specification," May 20, 2016, 29 pages.
Raikov, "IaaS Integration," Jul. 25, 2016, 26 pages.
Spasov, "Life-cycle Management Service," Jan. 29, 2016, 2 pages.
Savov, "Lifecycle Service Functional specification," Apr. 10, 2016, 10 pages.
Savov, "Preamble," Apr. 16, 2015, 14 pages.
VMware, Inc., "VMware vRealize Automation" [https://web.archive.org/web/20170707144613/https://docs.vmware.com/en/vRealize-Automation/index.html], dated Jul. 7, 2017, retrieved from www.archive.org on Jan. 14, 2020, 3 pages.

\* cited by examiner

METHODS AND APPARATUS TO GENERATE A SHADOW SETUP BASED ON A CLOUD ENVIRONMENT AND UPGRADE THE SHADOW SETUP TO IDENTIFY UPGRADE-RELATED ERRORS

RELATED APPLICATION

Benefit is claimed under 35 U.S.C. 119(a)-(d) to Foreign Application Serial No. 201741025777 filed in India entitled "METHODS AND APPARATUS TO GENERATE A SHADOW SETUP BASED ON A CLOUD ENVIRONMENT AND UPGRADE THE SHADOW SETUP TO IDENTIFY UPGRADE-RELATED ERRORS", filed on Jul. 20, 2017, by Nicira, Inc., which is herein incorporated in its entirety by reference for all purposes.

BACKGROUND

Virtualizing computer systems provides benefits such as the ability to execute multiple computer systems on a single hardware computer, replicating computer systems, moving computer systems among multiple hardware computers, and so forth. "Infrastructure-as-a-Service" (also commonly referred to as "IaaS") generally describes a suite of technologies provided by a service provider as an integrated solution to allow for elastic creation of a virtualized, networked, and pooled computing platform (sometimes referred to as a "cloud computing platform"). Enterprises may use IaaS as a business-internal organizational cloud computing platform (sometimes referred to as a "private cloud") that gives an application developer access to infrastructure resources, such as virtualized servers, storage, and networking resources. By providing ready access to the hardware resources required to run an application, the cloud computing platform enables developers to build, deploy, and manage the lifecycle of a web application (or any other type of networked application) at a greater scale and at a faster pace than ever before.

Cloud computing environments may be composed of many processing units (e.g., servers). The processing units may be installed in standardized frames, known as racks, which provide efficient use of floor space by allowing the processing units to be stacked vertically. The racks may additionally include other components of a cloud computing environment such as storage devices, networking devices (e.g., switches), etc.

Figure 1:
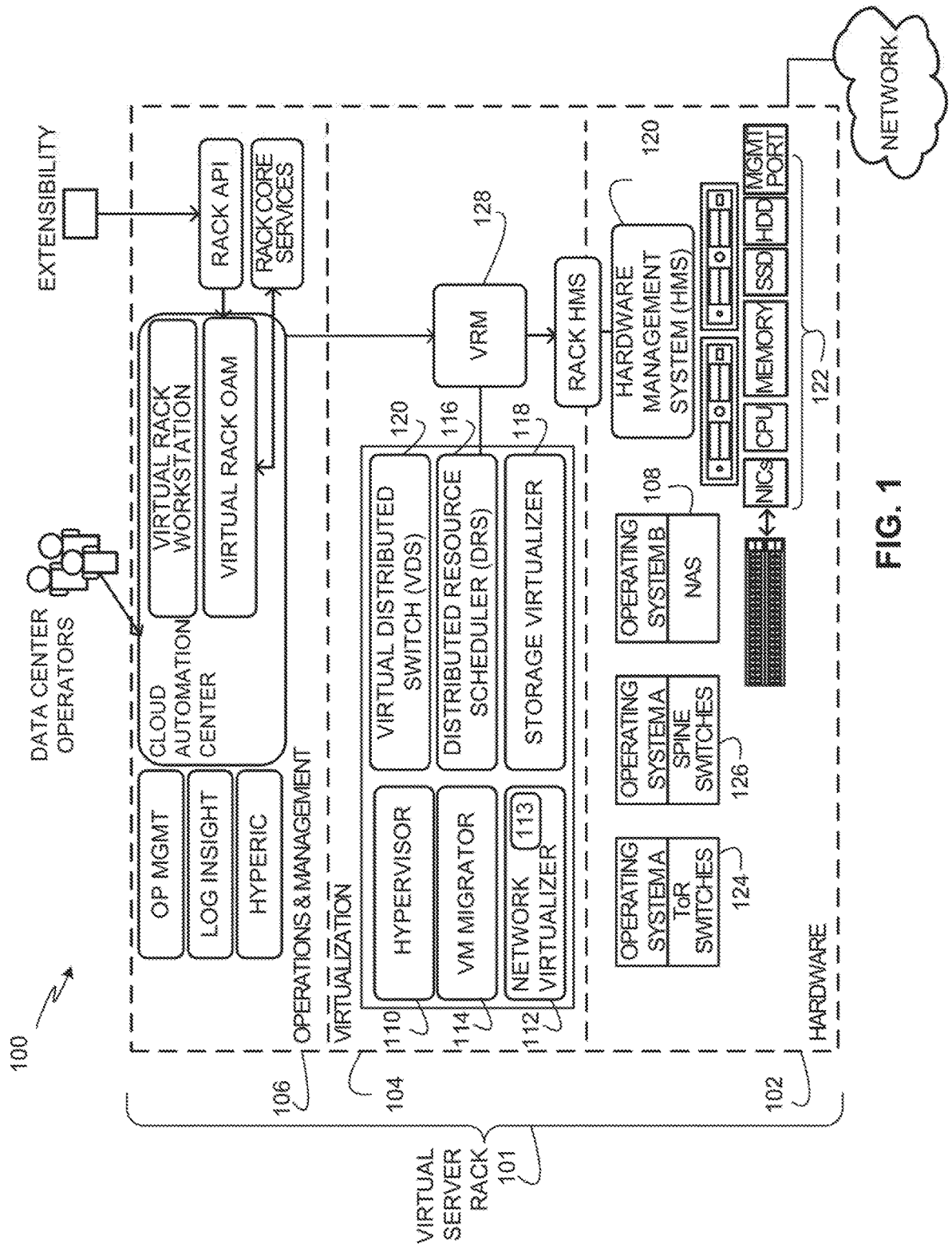
FIG. 1 depicts an example architecture to configure and deploy an example virtual server rack.

Wherever possible, the same reference numbers are used throughout the drawing(s) and accompanying written description to refer to the same or like parts. Connecting lines or connectors shown in the various figures presented are intended to represent example functional relationships and/or physical or logical couplings between the various elements.

DETAILED DESCRIPTION

Upgrading software or one or more components of virtualized environments is a necessary part of environment management to keep pace with evolving ecosystems to implement new functionality, meet business demands and growth, and/or meet customer expectations and government regulations. An upgrade may be generated by a manufacturer to update and/or adjust software of components in the virtualized environment. Once the upgrade generated, an option to upgrade is provided to a user. The user may accept the upgrade, thereby causing the software in the user's virtualized environment to upgrade according to the manufacturer-generated upgrade. Alternatively, the manufacturer-generated upgrade may be implemented in the user's virtualized environment automatically (e.g., without confirmation from the user. However, changed functionality, broken dependencies, incompatibility with legacy systems and configuration, etc. may cause upgrade errors and/or failures that cause downtime and/or data loss, thereby generating hesitancy, doubt, and/or concern from customers to perform an upgrade. In some examples, upgrades involve planning to discover and scan a datacenter for inventory objects and checking dependencies using an interoperability matrix and compatibility guides. However, even efficiently planned upgrades may fail due to hidden dependencies that may be unknown to a user or manufacturer. Such dependency increases the risk of upgrade failure and are may not be discoverable until after the upgrade fails.

Although conventional techniques may be used to reduce the downtime of an upgrade, such conventional techniques do not sufficiently protect against upgrade failure. Examples disclosed herein eliminate, or otherwise reduce, the risk of upgrade/change failures by generating and upgrading/changing a shadow (e.g., replica) set corresponding to the current live environment to check for upgrade/change errors. Additionally, or alternatively, examples disclosed herein may eliminate and/or reduce errors caused by changes in topology, configuration changes, and/or any other change in an environment that may generate an error.

Examples disclosed herein include scanning a live cloud environment (e.g., the customer's production environment) and generating a shadow setup (e.g., environment) based on the scanned data. As used herein, the live cloud environment/setup (e.g., live environment/setup, cloud environment/setup, cloud production environment/setup) corresponds to a current cloud-based virtualized environment provisioning virtual resources (e.g., virtual hardware resources) in software defined data centers to satisfy a customer's requirements. The shadow setup is a replica of the live production cloud environment. As used herein, environment and setup are used interchangeably.

The live production cloud environment may be ever changing as components are updated and/or adjusted to meet customer specifications (e.g., a shadow setup may be different for a cloud environment at different points in time). Accordingly, examples disclosed herein generate the shadow setup at the time of a potential upgrade/change to ensure that the upgrade/change will not fail in the current live production environment. The shadow setup includes the system component, configurations, and data samples of the live production cloud environment. Examples disclosed herein include performing an upgrade, configuration change, topology change, and/or any other change on the shadow setup to identify potential errors/failures corresponding to the update/change. Data related to the shadow setup upgrade/change (e.g., including data related to a failure or data related to a successful upgrade/change) is included in a report to a user, customer, and/or manufacturer. In this manner, a user, customer, and/or manufacturer can identify upgrade/change failures and adjust the live environment and/or not perform the upgrade/change prior to upgrading the live environment, thereby eliminating the risk of upgrade/change failure in the live environment. Examples disclosed herein may be used to identify upgrade failures/errors corresponding to software upgrades, topology changes, configuration changes, and/or any other material change to a virtual server rack architecture, thereby ensuring that unexpected errors do not occur.

Cloud computing is based on the deployment of many physical resources across a network, virtualizing the physical resources into virtual resources, and provisioning the virtual resources in software defined data centers (SDDCs) for use across cloud computing services and applications. Examples disclosed herein may be used to manage network resources in SDDCs to improve performance and efficiencies of network communications between different virtual and/or physical resources of the SDDCs. Examples disclosed herein may be used in connection with different types of SDDCs. In some examples, techniques disclosed herein are useful for managing network resources that are provided in SDDCs based on Hyper-Converged Infrastructure (HCI). In examples disclosed herein, HCI combines a virtualization platform such as a hypervisor, virtualized software-defined storage, and virtualized networking in an SDDC deployment. An SDDC manager can provide automation of workflows for lifecycle management and operations of a self-contained private cloud instance. Such an instance may span multiple racks of servers connected via a leaf-spine network topology and may connect to the rest of the enterprise network for north-south connectivity via well-defined points of attachment.

Examples disclosed herein may be used with one or more different types of virtualization environments. Three example types of virtualization environment are: full virtualization, paravirtualization, and operating system (OS) virtualization. Full virtualization, as used herein, is a virtualization environment in which hardware resources are managed by a hypervisor to provide virtual hardware resources to a virtual machine (VM). In a full virtualization environment, the VMs do not have access to the underlying hardware resources. In a typical full virtualization, a host OS with embedded hypervisor (e.g., a VMWARE® ESXI® hypervisor) is installed on the server hardware. VMs including virtual hardware resources are then deployed on the hypervisor. A guest OS is installed in the VM. The hypervisor manages the association between the hardware resources of the server hardware and the virtual resources allocated to the VMs (e.g., associating physical random-access memory (RAM) with virtual RAM). Typically, in full virtualization, the VM and the guest OS have no visibility and/or access to the hardware resources of the underlying server. Additionally, in full virtualization, a full guest OS is typically installed in the VM while a host OS is installed on the server hardware. Example virtualization environments include VMWARE® ESX® hypervisor, Microsoft HYPER-V® hypervisor, and Kernel Based Virtual Machine (KVM).

Paravirtualization, as used herein, is a virtualization environment in which hardware resources are managed by a hypervisor to provide virtual hardware resources to a VM, and guest OSs are also allowed to access some or all the underlying hardware resources of the server (e.g., without accessing an intermediate virtual hardware resource). In a typical paravirtualization system, a host OS (e.g., a Linux-based OS) is installed on the server hardware. A hypervisor (e.g., the XEN® hypervisor) executes on the host OS. VMs including virtual hardware resources are then deployed on the hypervisor. The hypervisor manages the association between the hardware resources of the server hardware and the virtual resources allocated to the VMs (e.g., associating RAM with virtual RAM). In paravirtualization, the guest OS installed in the VM is configured also to have direct access to some or all of the hardware resources of the server. For example, the guest OS may be precompiled with special drivers that allow the guest OS to access the hardware resources without passing through a virtual hardware layer. For example, a guest OS may be precompiled with drivers that allow the guest OS to access a sound card installed in the server hardware. Directly accessing the hardware (e.g., without accessing the virtual hardware resources of the VM) may be more efficient, may allow for performance of operations that are not supported by the VM and/or the hypervisor, etc.

OS virtualization is also referred to herein as container virtualization. As used herein, OS virtualization refers to a system in which processes are isolated in an OS. In a typical OS virtualization system, a host OS is installed on the server hardware. Alternatively, the host OS may be installed in a VM of a full virtualization environment or a paravirtualization environment. The host OS of an OS virtualization system is configured (e.g., utilizing a customized kernel) to provide isolation and resource management for processes that execute within the host OS (e.g., applications that execute on the host OS). The isolation of the processes is known as a container. Thus, a process executes within a container that isolates the process from other processes executing on the host OS. Thus, OS virtualization provides isolation and resource management capabilities without the resource overhead utilized by a full virtualization environment or a paravirtualization environment. Example OS virtualization environments include Linux Containers LLC and LXD, the DOCKER™ container platform, the OPENVZ™ container platform, etc.

In some examples, a data center (or pool of linked data centers) may include multiple different virtualization environments. For example, a data center may include hardware resources that are managed by a full virtualization environment, a paravirtualization environment, and an OS virtualization environment. In such a data center, a workload may be deployed to any of the virtualization environments. Through techniques to monitor both physical and virtual infrastructure, examples disclosed herein provide visibility into the virtual infrastructure (e.g., VMs, virtual storage, virtual networks and their control/management counterparts) and the physical infrastructure (servers, physical storage, network switches).

Examples disclosed herein may be employed with HCI-based SDDCs deployed using virtual server rack systems such as the virtual server rack 101 of FIG. 1. A virtual server rack system can be managed using a set of tools that is accessible to all modules of the virtual server rack system. Virtual server rack systems can be configured in many different sizes. Some systems are as small as four hosts, and other systems are as big as tens of racks. As described in more detail below in connection with FIG. 1, multi-rack deployments can include Top-of-the-Rack (ToR) switches (e.g., leaf switches) and spine switches connected using a Leaf-Spine architecture. A virtual server rack system also includes software-defined data storage (e.g., storage area network (SAN), VMWARE® VIRTUAL SAN™) distributed across multiple hosts for redundancy and virtualized networking software (e.g., VMWARE NSX™).

FIG. 1 depicts an example virtual server rack architecture 100 that may be used to configure and deploy example virtual server rack 101. Virtual server rack architecture 100 of FIG. 1 includes example hardware layer 102, example virtualization layer 104, and example operations and management layer (OAM) 106. In the illustrated example, hardware layer 102, virtualization layer 104, and OAM layer 106 are part of virtual server rack 101. Virtual server rack 101 of the illustrated example is based on physical racks. Virtual server rack 101 configures example physical hardware resources 122, virtualizes physical hardware resources 122 into virtual resources, provisions virtual resources for use in providing cloud-based services, and maintains physical hardware resources 122 and the virtual resources.

Hardware layer 102 of FIG. 1 includes example HMS(s) 120 that interfaces with physical hardware resources 122 (e.g., processors, network interface controllers (NICs), servers, switches, storage devices, peripherals, and/or power supplies), example ToR switches 124, example spine switches 126, and example network attached storage (NAS) hardware 108. In the illustrated example, ToR switches 124, implement leaf switches such that ToR switches 124, and spine switches 126 are in communication with one another in a leaf-spine switch configuration. In the illustrated example, example VRM(s) 128 are included in the physical racks and communicate with each other through one or more spine switches 126. Also in the illustrated example, communications between physical hardware resources 122 of the physical racks are exchanged between ToR switches 124 of the physical racks through the one or more spine switches 126. In the illustrated example, the infiniband (IB) connection interfaces to physical hardware resources 122 via an OS running on the server nodes using an OS-specific application programming interface (API) such as VMWARE VSPHERE® API, command line interface (CLI), and/or interfaces such as Common Information Model from Distributed Management Task Force (DMTF).

In examples disclosed herein, a CLI and APIs are used to manage ToR switches 124. For example, HMS 120 uses CLI/APIs to populate switch objects corresponding to ToR switches 124. On HMS bootup, HMS 120 populates initial switch objects with statically available information. In addition, HMS 120 uses a periodic polling mechanism as part of an HMS switch management application thread to collect statistical and health data from ToR switches 124 (e.g., Link states, Packet Stats, and/or Availability). There is also a configuration buffer as part of the switch object which stores the configuration information to be applied on the switch.

HMS 120 of the illustrated example of FIG. 1 is a stateless software agent responsible for managing individual hardware resources in a physical rack. Examples of hardware elements that HMS 120 manages are servers and network switches in the physical rack. In the illustrated example, HMS 120 is implemented using Java on Linux so that an out of band (OOB) management portion of HMS 120 runs as a Java application on a white box management switch in the physical rack. However, any other programming language and any other OS may be used to implement HMS 120.

HMS 120 is configured to manage individual hardware nodes such as different ones of physical hardware resources 122. For example, managing of the hardware nodes involves discovering nodes, bootstrapping nodes, resetting nodes, processing hardware events (e.g., alarms, sensor data threshold triggers) and state changes, exposing hardware events and state changes to other resources and a stack of virtual server rack 101 in a hardware-independent manner. HMS 120 also supports rack-level boot-up sequencing of physical hardware resources 122 and provides services such as secure resets, remote resets, and/or hard resets of physical hardware resources 122.

HMS 120 of the illustrated example is part of a dedicated management infrastructure in one or more corresponding physical racks including the dual-redundant management switches and dedicated management ports attached to the server host nodes and ToR switches 124. In the illustrated example, one instance of HMS 120 runs per physical rack. For example, HMS 120 may run on one or more management switches and one or more server host node(s) installed in the physical rack. In the illustrated example of FIG. 1 both of the HMSs 120 are provided in corresponding management switches and the corresponding server host nodes as a redundancy feature in which one of the HMSs 120 is a primary HMS, while the other one of the HMSs 120 is a secondary HMS. In this manner, one of HMSs 120 may take over as a primary HMS in the event of a failure of a hardware management switch and/or a failure of the server host nodes on which the other HMS 120 executes. In some examples, to achieve seamless failover, two instances of an HMS 120 run in a single physical rack. In such examples, the physical rack is provided with two management switches, and each of the two management switches runs a separate instance of HMS 120. In such examples, the physical rack runs two instances of HMS 120 on two separate physical hardware management switches and two separate server host nodes, and the physical rack runs two instances of HMS 120 on two separate physical hardware management switches and two separate server host nodes. In this manner, for example, one of the instances of HMS 120 on the physical rack serves as primary HMS 120 and the other instance of HMS 120 serves as secondary HMS 120. The two instances of HMS 120 on two separate management switches and two separate server host nodes in the physical rack (or the two instances of HMS 120 on two separate management switches and two separate server host nodes in the physical rack) are connected over a point-to-point, dedicated Ethernet link which carries heartbeats and memory state synchronization between the primary and secondary HMS instances.

Virtualization layer 104 includes one or more example VRMs 128. VRM 128 communicates with HMS 120 to manage physical hardware resources 122. VRM 128 creates example virtual server rack 101 out of underlying physical hardware resources 122 that may span one or more physical racks (or smaller units such as a hyper-appliance or half rack) and handles physical management of those resources. VRM 128 uses virtual server rack 101 as a basis of aggregation to create and provide operational views, handle fault domains, and scale to accommodate workload profiles. VRM 128 keeps track of available capacity in virtual server rack 101, maintains a view of a logical pool of virtual resources throughout the SDDC life-cycle, and translates logical resource provisioning to allocation of physical hardware resources 122. VRM 128 interfaces with an example hypervisor 110 of virtualization layer 104. Hypervisor 110 is installed and runs on server hosts in example physical resources 122 to enable the server hosts to be partitioned into multiple logical servers to create VMs. In some examples, hypervisor 110 may be implemented using a VMWARE ESXI™ hypervisor available as a component of a VMWARE VSPHERE® virtualization suite developed and provided by VMware, Inc. The VMWARE VSPHERE® virtualization suite is a collection of components to setup and manage a virtual infrastructure of servers, networks, and other resources In the illustrated example of FIG. 1, hypervisor 110 is shown having a number of virtualization components executing thereon including an example network virtualizer 112, an example VM migrator 114, an example distributed resource scheduler (DRS) 116, an example storage virtualizer 118, and an example virtual switch 121. In the illustrated example, VRM 128 communicates with these components to manage and present the logical view of underlying resources such as hosts and clusters. VRM 128 also uses the logical view for orchestration and provisioning of workloads.

Network virtualizer 112 virtualizes network resources such as physical hardware switches (e.g., the management switches, ToR switches 124, and/or spine switches 126) to provide software-based virtual networks. Network virtualizer 112 enables treating physical network resources (e.g., switches) as a pool of transport capacity. In some examples, network virtualizer 112 also provides network and security services to VMs with a policy driven approach. Network virtualizer 112 includes a number of components to deploy and manage virtualized network resources across servers, switches, and clients. For example, network virtualizer 112 includes a network virtualization manager that functions as a centralized management component of network virtualizer 112 and runs as a virtual appliance on a server host. In some examples, network virtualizer 112 may be implemented using a VMWARE NSX™ network virtualization platform that includes a number of components including a VMWARE NSX™ network virtualization manager (e.g., a centralized network management component providing an aggregated system view), a VMWARE NSX™ network virtualization controller (e.g., a central control point for all logical switches (e.g., ToR switches 124 and/or spine switches 126 of FIG. 1) within the network maintaining information of all VMs, hosts, logical switch, and virtual extensible local area networks (VXLANs)), an NSX network virtualization edge (e.g., providing network edge security and gateway services to isolate the virtualized network), etc.

Network virtualizer 112 of FIG. 1 includes an example shadow upgrader 113. Shadow upgrader 113 generates a shadow setup based on virtual server rack architecture 100. The shadow setup is a replica environment that may, or may not, be a scaled down replica (e.g., depending on sampling criteria). When a software upgrade, topology change, configuration change, etc. is available for network virtualizer 112, shadow upgrader 113 generates the shadow setup and performs the software upgrade in the shadow setup to identify errors and/or failures that may occur corresponding to the upgrade, topology change, configuration change, etc. In this manner, a user is able to identify potential problems corresponding to the upgrade prior to performing the upgrade in the customer's live environment. Although shadow upgrader 113 of FIG. 1 is illustrated in network virtualizer 112 to generate and upgrade shadow setups corresponding to a software upgrade to network virtualizer 112, shadow upgrader 113 may be implemented in any software component of virtual server rack architecture 100 and/or may be a stand-alone device to identify any type of potential upgrade failures/errors in virtual server rack architecture 100. For example, shadow upgrader 113 may be used to identify upgrade failures/errors corresponding to topology changes, configuration changes, and/or any other material change to virtual server rack architecture 100, thereby ensuring that unexpected errors do not occur. Shadow upgrader 113 is further described below in conjunction with FIG. 2.

VM migrator 114 is provided to move or migrate VMs between different hosts without losing state during such migrations. For example, VM migrator 114 allows moving an entire running VM from one physical server to another with substantially little or no downtime. The migrating VM retains its network identity and connections, which results in a substantially seamless migration process. VM migrator 114 enables transferring the VM's active memory and precise execution state over a high-speed network, which allows the VM to switch from running on a source server host to running on a destination server host.

DRS 116 is provided to monitor resource utilization across resource pools, to manage resource allocations to different VMs, to deploy additional storage capacity to VM clusters with substantially little or no service disruptions, and to work with VM migrator 114 to automatically migrate VMs during maintenance with substantially little or no service disruptions.

Storage virtualizer 118 is software-defined storage for use in connection with virtualized environments. Storage virtualizer 118 clusters server-attached hard disk drives (HDDs) and solid state drives (SSDs) to create a shared datastore for use as virtual storage resources in virtual environments. In some examples, Storage virtualizer 118 may be implemented using a VMWARE® VIRTUAL SAN™ network data storage virtualization component developed and provided by VMware, Inc.

Virtual switch 121 implements software-defined networks for use in connection with virtualized environments in the form of a networking module for hypervisor 110. In some examples, virtual switch 121 may share state information and be configured with other virtual switches on other hosts as a collection of virtual switches. Such collections of virtual switches may be referred to as a distributed virtual switch.

Virtualization layer 104 of the illustrated example, and its associated components are configured to run VMs. However, in other examples, virtualization layer 104 may additionally, and/or alternatively, be configured to run containers. For example, virtualization layer 104 may be used to deploy a VM as a data computer node with its own guest OS on a host using resources of the host. Additionally, and/or alternatively, virtualization layer 104 may be used to deploy a container as a data computer node that runs on top of a host OS without the need for a hypervisor or separate OS.

One example of OAM layer 106 could be an operation manager, such as VMware vRealize®, which includes deployment workflows, log analysis, monitoring, etc. OAM layer 106 is configured to provide different services such as health monitoring service, capacity planner service, maintenance planner service, events and operational view service, and virtual rack application workloads manager service.

Figure 2:
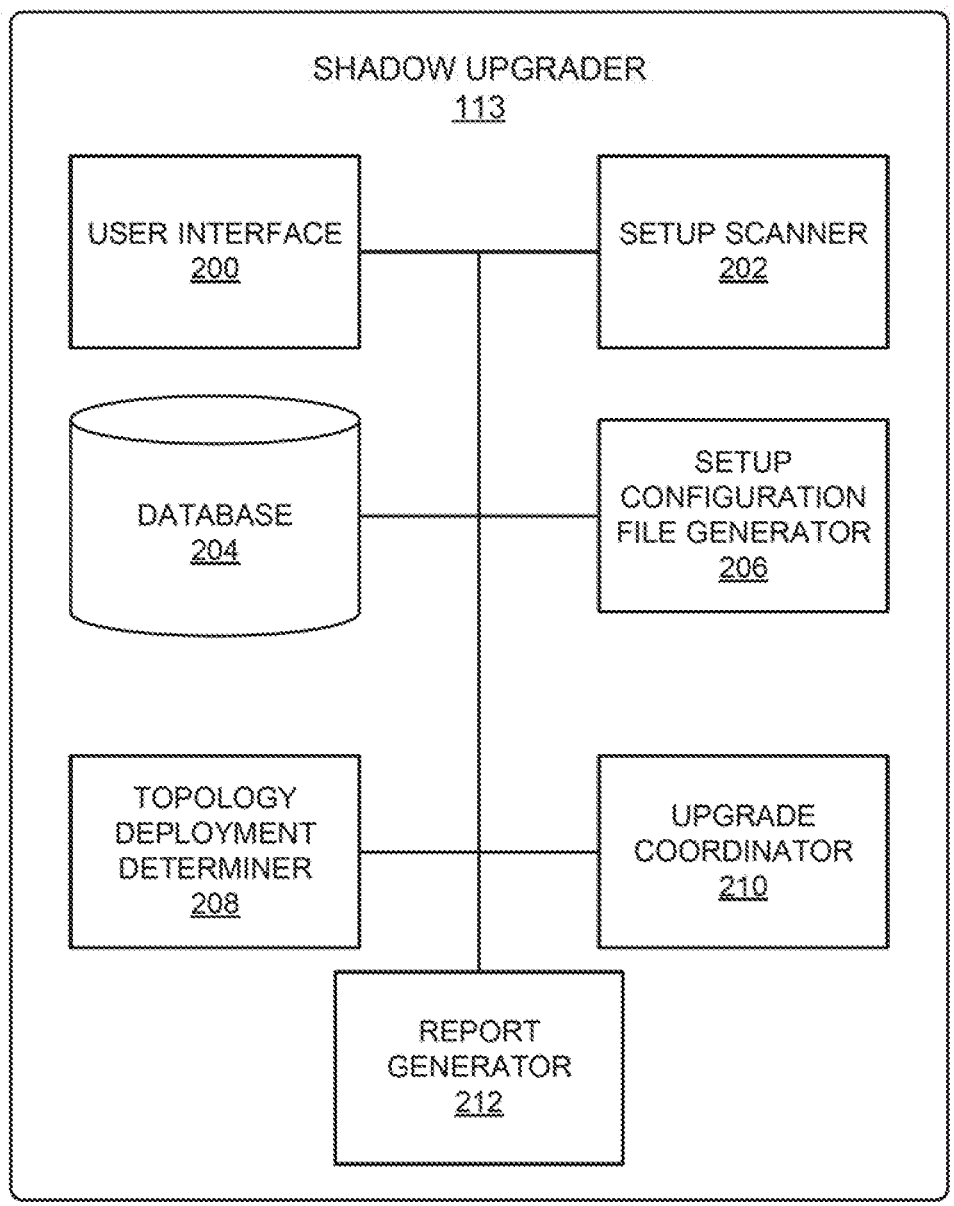
FIG. 2 depicts a block diagram of an example shadow upgrader of FIG. 1.

FIG. 2 illustrates an example block diagram of shadow upgrader 113 of FIG. 1 to generate a shadow environment for testing the effects of a component/system upgrade. A shadow environment/setup is a replica of the live cloud environment (virtual server rack architecture 100) that may be used to test updates and/or changes to the live cloud environment without actually updating and/or changing the live cloud environment. In this manner, the shadow environment can be generated and upgraded to identify potential errors that may occur during the upgrade to troubleshoot and prevent such errors during a live environment upgrade. In some examples, the shadow environment is a replica version of the live cloud environment. For example, the shadow environment may include a fraction of the data, firewall rules, VMs, etc. of the live cloud environment, while including enough live production data to detect upgrade/change errors/failures. The characteristics of the shadow environment are based on sampling criteria, as further described below. Shadow upgrader 113 includes an example user interface 200, an example setup scanner 202, an example database 204, an example setup configuration file generator 206, an example topology deployment determiner 208, an example upgrade coordinator 210, and an example report generator 212. Each of these components of shadow upgrader 113 may be implemented by an associated set of computer program instructions that, when executed on a general purpose computer system, causes the computer to carry out the functions described, i.e., by transforming the general purpose computer system into a special purpose computer system that is configured for the performing the identified functions.

User interface 200 of FIG. 2 provides an interface for a user (e.g., customer) to interact with shadow upgrader 113. For example, when a software upgrade corresponding to a component of a live cloud environment (e.g., virtual server rack architecture 100) is released or otherwise provider to a user, user interface 200 provides an option for the user to initiate the generation of a shadow environment based on a production setup of a live environment corresponding to a cloud system or environment (e.g., virtual server rack architecture 100) to model the upgrade before performing the upgrade in the live environment. Additionally or alternatively, interface 200 provides an option for the user to initiate the generation of the shadow environment when the user and/or another device attempts to change the topology of the live environment, change configurations in the live environment, and/or change anything in the live environment that may cause an error. In some examples, user interface 200 displays generated configuration files corresponding to the sampling criteria (e.g., identifying possible configurations and logical objects in the shadow setup) for user approval prior to initiating the shadow environment. After a shadow environment has been updated, user interface 200 provides a report to a user identifying the performances of the update. As further described below, the report includes any errors that may have occurred during the update, data related to errors that may have occurred during the update, data related to a successful update, etc. Additionally, user interface 200 may provide an interface for a user to move forward with updating one or more components of the production setup of the live environment (e.g., virtual server rack architecture 100).

Setup scanner 202 of FIG. 2 scans the production setup of the live (e.g., currently running) cloud environment (e.g., virtual server rack architecture 100) based on scanning rules. The scanning rules instruct how to scan the live cloud environment. For example, when an upgrade corresponds to a software upgrade of network virtualizer 112, scanning rules may include data corresponding to an NSX manager, an NSX controller, an NSX Edge, data place components, number of hardware virtualizations, number of tenant VMs, logical object (e.g., including logical switches, transport nodes, transport zones, security groups, policies, and/or distributed firewall (DFW) rules), etc. Additionally or alternatively, scanning rules may correspond to process(es) and/or service(s) running on nodes (e.g., CPU, memory, and/or storage) of the cloud environment, the configuration of the nodes, the topology details on which the nodes are deployed (e.g., ESX or KVM). In some examples, setup scanner 202 uses an API or a CLI to gather the data corresponding to the cloud environment. For example, setup scanner 202 uses API(s) in an NSX manager to return data corresponding to an NSX controller, NSX edge, and/or host nodes associated with the NSX manager. In another example, setup scanner 202 uses CLI(s) on the NSX controller and/or hosts may gather data from a MAC table and/or internet protocol (IP) table entry(ies). Setup scanner 202 stores the scanned data in database 204.

Setup configuration file generator 206 of FIG. 2 generates a configuration file based on sampling criteria. The configuration file corresponds to the data needed for deployment and configuration of the shadow setup/environment by topology deployment determiner 208. The sampling criteria provides information corresponding to how to replicate the live cloud environment to the shadow setup. The sampling criteria may be dynamically deduced using scripts based on common configurations and available live data from the live cloud environment. For example, if 10 firewall rules have the similar traffic configuration, the 10 firewall rules may be scaled down to a single firewall rule according to the sampling criteria. In another example, if 10 logical switches are spanned across 10 hypervisors having similar operating systems, then the sampling rules may facilitate the scaling down the 10 logical switches across the 10 hypervisors to 1 logical switch across 1 hypervisor Customers and/or manufactures may define the sampling criteria and make it customizable for physical or logical components (e.g., covering logical network components for scaling). The physical components may include hypervisor 110 in virtual server rack architecture 100, ToR switches 124, VSAN storage, memory, CPUs, etc. Logical components may include number of VMs, distributed firewall rules, NSX security groups, NSX security policies, NSX local switches/logical routers, etc. In this manner, the sampling criteria allows a customer and/or manufacture to select possible configurations and/or logical objects in the shadow setup.

In some examples, the sampling criteria allow a customer to generate the shadow setup as a scaled down version of the live cloud environment. For example, the sampling criteria allows configuration file generator 206 to generate a configuration file corresponding to a fraction of the size of the live environment (e.g., $\frac{1}{10}^{th}$). For example, the live cloud environment may include 100 logical switches (e.g., ToR switches 124 and/or spine switches 126 of FIG. 1), but the setup configuration file generator 206 may generate a shadow setup (e.g., environment) including 10 logical switches based on the sampling criteria (e.g., based on different combination of the logical switches). In another example, the cloud environment may include 4000 firewall rules but the shadow environment may include 100 firewall rules covering all possible combinations of the 4000 rules. In another example, a live cloud environment includes 1000 tenants VMs but the shadow environment may have 50 tenant VMs with different OS combinations.

Topology deployment determiner 208 of FIG. 2 deploys the shadow environment based on the configuration file generated by setup configuration file generator 206. In some examples, topology deployment determiner 208 uses an ANSIBLE® topology deployment tool to deploy and configure the shadow environment in a controlled customer environment as part of a dry run prior to live production upgrade. However, topology deployment determiner 208 may use any deployment tool that is a virtual appliance containing a set of scripts which perform actions (e.g., deployment, configuration, upgrade, and/or sample logic) causing the use of specific APIs/CLIs. In some examples, once deployed, topology deployment determiner 208 verifies the shadow environment for correctness, connectivity, communication channels, feature workflows, etc. before upgrade coordinator 210 upgrades the shadow setup. In this manner, if a problem exists in the deployed shadow setup, topology deployment determiner 208 can fix the problem prior to the upgrade. In some examples, once, the deployment has been generated, upgraded/changed, and a report has been generated based on the upgrade/change, topology deployment determiner 208 may delete (e.g., to conserve resources) and/or keep (for future use like teardown and/or to gather support logs) the shadow environment.

Upgrade coordinator 210 of FIG. 2 upgrades and/or changes the shadow environment once deployed. Upgrade coordinator 210 upgrades the shadow environment based on an upgrade/update provided by a manufacturer of the one or more components of the live environment. For example, a manufacture may provide an update to fix and/or adjust functionality of one or more components of the live environment. A change may be based on a topology change, a configuration change, and/or any other change in the live environment generated by the manufacturer and/or a customer. In some examples, upgrade coordinator 210 may be implemented by a device included in the live environment. For example, for an NSX upgrade, upgrade coordinator 210 may be implemented in an upgrade coordinator of network virtualizer 112 (e.g., providing a graphical user interface (GUI) to automatically upgrade the complete NSX system). In some examples, upgrade coordinator 210 invokes a Python orchestrator to perform post upgrade verification covering GUI, API, CLI, and/or other functional aspects. Additionally, upgrade coordinator 210 may perform post upgrade verification on the shadow environment to ensure upgrade success. In some examples, upgrade coordinator 210 may perform a live upgrade (e.g., corresponding to the shadow upgrade) to the live environment based on a successful upgrade in the shadow environment. In such examples, upgrade coordinator 210 may perform the live upgrade after confirmation from a user/customer via user interface 200. In some examples, upgrade coordinator 210 may prevent or hinder a user from initiating the live upgrade to the live environment when an error has occurred in the shadow setup. For example, the user may be forced to acknowledge warning or alert messages before proceeding with or initiating the upgrade to the live environment.

Report generator 212 of FIG. 2 generates a report corresponding to the upgrade of the shadow setup. The report may include data related to whether the upgrade was successful or not. If the upgrade was not successful, the report may include data related to why the upgrade was not successful, what parts of the upgrade caused error(s), potential solutions to the error(s), etc. Report generator 212 displays the report to the user/customer via user interface 200.

While an example manner of implementing shadow upgrader 113 of FIG. 1 is illustrated in FIG. 2, one or more of the elements, processes and/or devices illustrated in FIG. 2 may be combined, divided, re-arranged, omitted, eliminated, and/or implemented in any other way. Further, user interface 200, setup scanner 202, database 204, setup configuration file generator 206, topology deployment determiner 208, upgrade coordinator 210, report generator 212, and/or, more generally, shadow upgrader 113 of FIG. 2, may be implemented by hardware, software, firmware and/or any combination of hardware, software and/or firmware. Thus, for example, any of user interface 200, setup scanner 202, database 204, setup configuration file generator 206, topology deployment determiner 208, upgrade coordinator 210, report generator 212, and/or, more generally, shadow upgrader 113 of FIG. 2, could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of user interface 200, setup scanner 202, database 204, setup configuration file generator 206, topology deployment determiner 208, upgrade coordinator 210, report generator 212, and/or, more generally, shadow upgrader 113 of FIG. 2, is/are hereby expressly defined to include a non-transitory computer readable storage device or storage disk such as a memory, a digital versatile disk (DVD), a compact disk (CD), a Blu-ray disk, etc. including the software and/or firmware. Further still, user interface 200, setup scanner 202, database 204, setup configuration file generator 206, topology deployment determiner 208, upgrade coordinator 210, report generator 212, and/or, more generally, shadow upgrader 113 of FIG. 2, may include one or more elements, processes and/or devices in addition to, or instead of, those illustrated in FIG. 2, and/or may include more than one of any or all of the illustrated elements, processes, and devices.

Figure 3A:
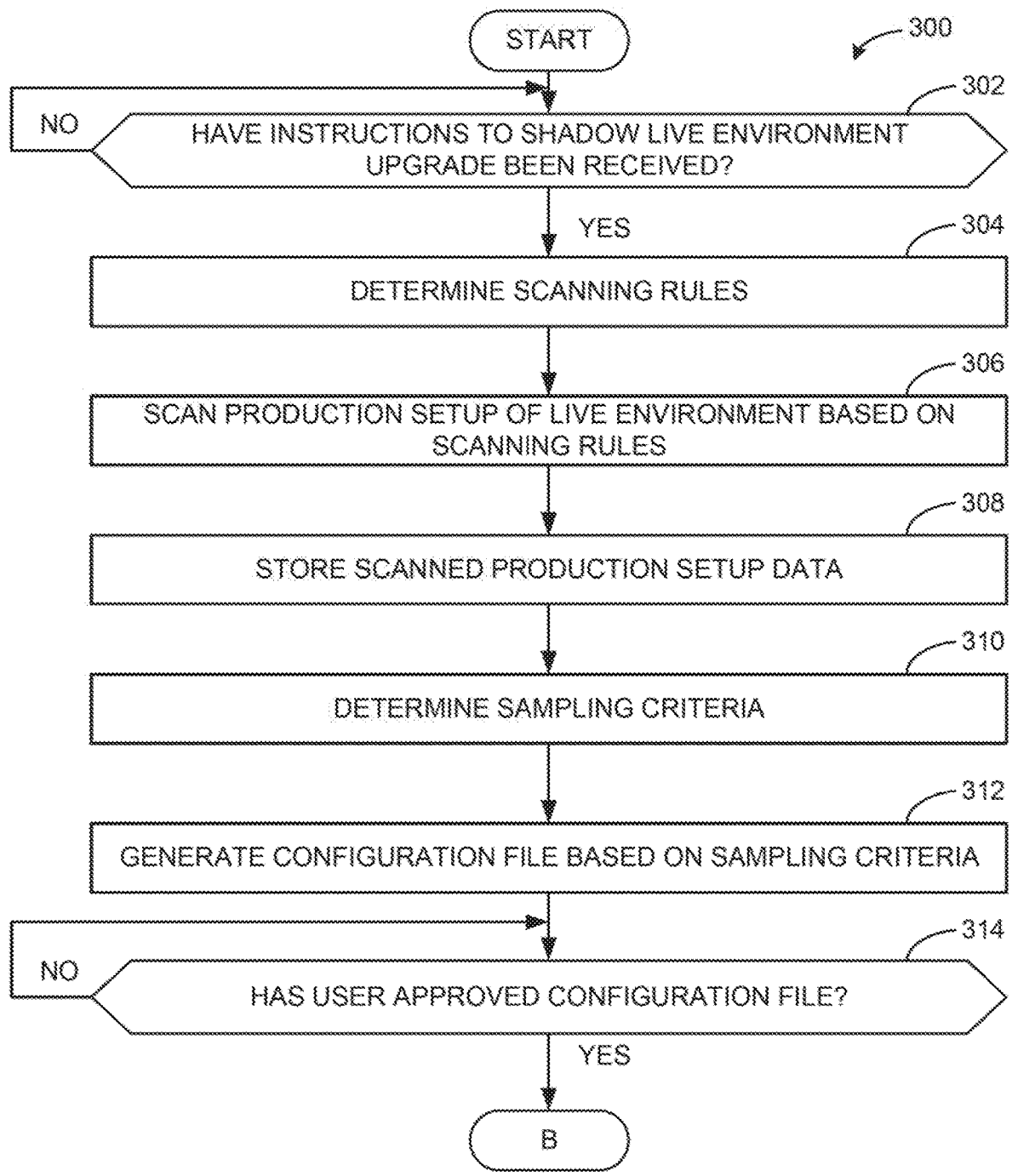
FIGS. 3A-3B depict a flowchart representative of computer readable instructions that may be executed to implement the example shadow upgrader of FIGS. 1 and/or 2.
Figure 3B:
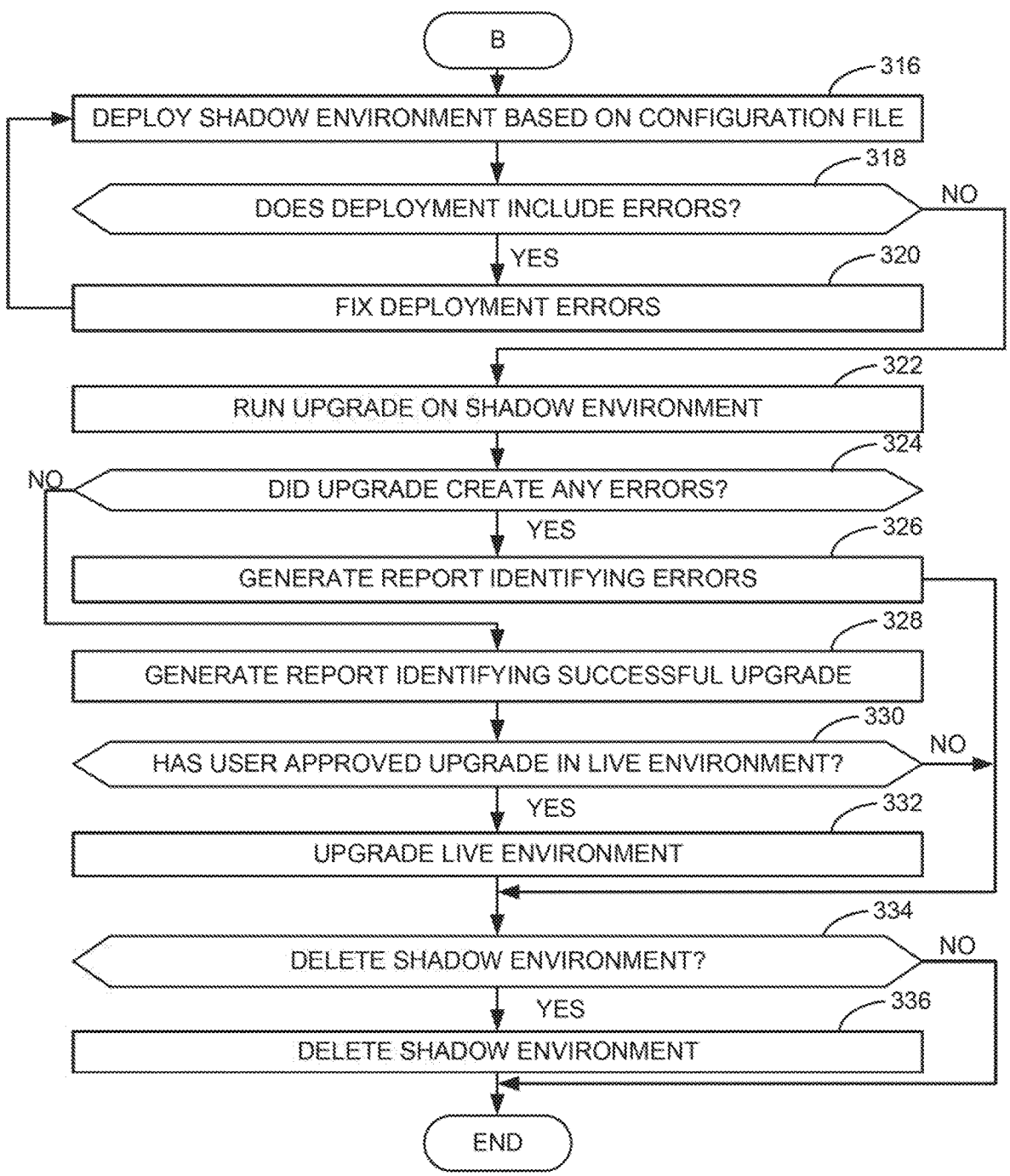

Flowcharts representative of example machine readable instructions for implementing user interface 200, setup scanner 202, database 204, setup configuration file generator 206, topology deployment determiner 208, upgrade coordinator 210, report generator 212, and/or, more generally, shadow upgrader 113 of FIG. 2, are shown in FIGS. 3A-3B. In these examples, the machine readable instructions comprise a program for execution by a processor such as an example processor 412 shown in example processor platform 400 discussed below in connection with FIG. 4. The program may be embodied in software stored on a non-transitory computer readable storage medium such as a CD-ROM, a floppy disk, a hard drive, a digital versatile disk (DVD), a Blu-ray disk, or a memory associated with processor 412, but the entire program and/or parts thereof could alternatively be executed by a device other than processor 412 and/or embodied in firmware or dedicated hardware. Further, although the example program is described with reference to the flowcharts illustrated in FIGS. 3A-3B, many other methods of deploying, evaluating, and installing services on component servers in accordance with the teachings of this disclosure may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), and/or a logic circuit) structured to perform the corresponding operation without executing software or firmware.

As mentioned above, the example processes of FIGS. 3A-3B may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, and/or including), it is to be understood that additional elements, terms, etc. may be present without falling outside the scope of the corresponding claim. As used herein, when the phrase "at least" is used as the transition term in a preamble of a claim, it is open-ended in the same manner as the term "comprising" and "including" are open ended.

FIGS. 3A-3B depict an example flowchart 300 representative of computer readable instructions that may be executed to implement shadow upgrader 113 of FIG. 2 to generate a shadow setup and upgrade and/or change the shadow setup to identify upgrade-related errors. Although the flowchart 300 of FIGS. 3A-3B is described in conjunction with shadow upgrader 113 in network virtualize 112 of FIG. 1, the process may be implemented using any type of decision shadow upgrader to generate a shadow setup and update/change the shadow setup to identify errors corresponding to any component of a cloud environment.

Initially, at block 302, user interface 200 determines if instructions to shadow a live environment upgrade have been received from a user/customer. The instructions to shadow a live environment upgrade include generating a shadow environment based on the current cloud environment (e.g., a replica of virtual server rack architecture 100). The instructions may be automated (e.g., via a prompt from a manufacture or one or more components of the live environment) and/or may be based on user instructions (e.g., to change the configurations and/or topology of the live environment). If the upgrade is automated, the upgrade may require approval from a user via user interface 200 to move forward with the generation and upgrade of the shadow environment. If user interface 200 determines that instructions to shadow a live environment upgrade have not been received from a user/customer (block 302: NO), user interface 200 waits until instructions to shadow the live environment upgrade have been received.

If user interface 200 determines that instructions to shadow a live environment upgrade have been received from a user/customer (block 302: YES), setup scanner 202 determines scanning rules (block 304). As described above in conjunction with FIG. 2, the scanning rules identify what components to scan in the customer production setup of the live cloud environment (e.g., virtual server rack architecture 100) to develop the shadow setup. At block 306, setup scanner 202 scans the production setup of the live environment based on the scanning rules. For example, setup scanner 202 may use API and/or CLI to gather data from the live cloud environment based on the scanning rules. At block 308, setup scanner 202 stores the scanned production setup data in database 204.

At block 310, setup configuration file generator 206 determines the sampling criteria. The sampling criteria provides the configurations related to the scaling down of the live environment components, logical objects, and/or other resources. The sampling criteria may be based on user and/or manufacture preferences. At block 312, setup configuration file generator 206 generates a configuration file (e.g., a config.yaml file) corresponding to the sampling criteria and the scanned production setup data stored in database 204. The configuration file includes all the data related to the shadow environment to be generated. The configuration file may be displayed, or otherwise output, to a user/customer via user interface 200 for approval.

At block 314, user interface 200 determines if the user/customer has approved the generated configuration file. The user may approve the configuration file by interacting with user interface 200 to verify the user's approval. If user interface 200 has determined that user has not yet approved the configuration file (block 314: NO), user interface 200 waits until the user has approved configuration file. In some examples, if a threshold amount of time has passed and the user has not yet approved, the process may end or user interface 200 may allow the user to change the configuration file until the user approves.

If user interface 200 has determined that user has approved the configuration file (block 314: YES), topology deployment determiner 208 deploys the shadow environment/setup based on the approved configuration file (block 316). For example, topology deployment determiner 208 may generate/deploy the shadow setup based on the configuration file using topology deployment tools (e.g., ANSIBLE® deployment tools). In some examples, shadow setup is deployed in a controlled customer environment as part of a dry run prior to live production upgrade. At block 318, topology deployment determiner 208 determines if the deployment of the shadow setup included any errors. If topology deployment determiner 208 determines that the deployment of the shadow setup included one or more errors (block 318: YES), topology deployment determiner 208 fixes the one or more deployment errors (block 320) and the process returns to block 316 to deploy a new shadow environment without such errors.

If topology deployment determiner 208 determines that the deployment of the shadow setup does not include one or more errors (block 318: NO), upgrade coordinator 210 runs the upgrade on the shadow environment/setup (block 322). As described above, running the upgrade on the shadow environment allows the user/customer to determine if any unexpected upgrade errors/failures may occur during the upgrade in the live cloud environment. In this manner, a customer/user can better predict the output of an upgrade and better prepare for the upgrading process. At block 324, upgrade coordinator 210 determines if the upgrade to the shadow setup created any errors. If upgrade coordinator 210 determines that the upgrade to the shadow setup created one or more errors (block 324: YES), report generator 212 generates a report identifying the error(s) (block 326). The report may include the details related to the error(s) (e.g., how the error occurred, what components caused and/or are associated with the error(s), and/or potential causes and/or solutions to the error(s)). In such examples, upgrade coordinator 210 may prevent a live upgrade (e.g., corresponding to the shadow upgrade) in the live environment when an error occurs in the shadow setup.

If upgrade coordinator 210 determines that the upgrade to the shadow setup did not create one or more errors (block 324: NO), report generator 212 generates a report identifying a successful upgrade (block 328). As described above in conjunction with FIG. 2, the report is displayed to the user/customer via user interface 200. Additionally, user interface 200 may display an option for the user/customer to move forward with the upgrade in the live cloud environment. At block 330, user interface 200 determines if the user/customer has approved the upgrade in the live cloud environment (e.g., by receiving an approval from the user/customer via user interface 200). If user interface 200 determines that the user/customer has not approved the update in the live environment (block 330: NO), the process continues to block 334. If user interface 200 determines that the user/customer has approved the update in the live environment (block 330: YES), upgrade coordinator 210 upgrades (e.g., a live upgrade) the live environment (block 332). topology deployment determiner 208 deletes the shadow environment (block 336). If user interface 200 determines that the user/customer has not approved the update in the live environment (block 330: NO), the process ends.

Figure 4:
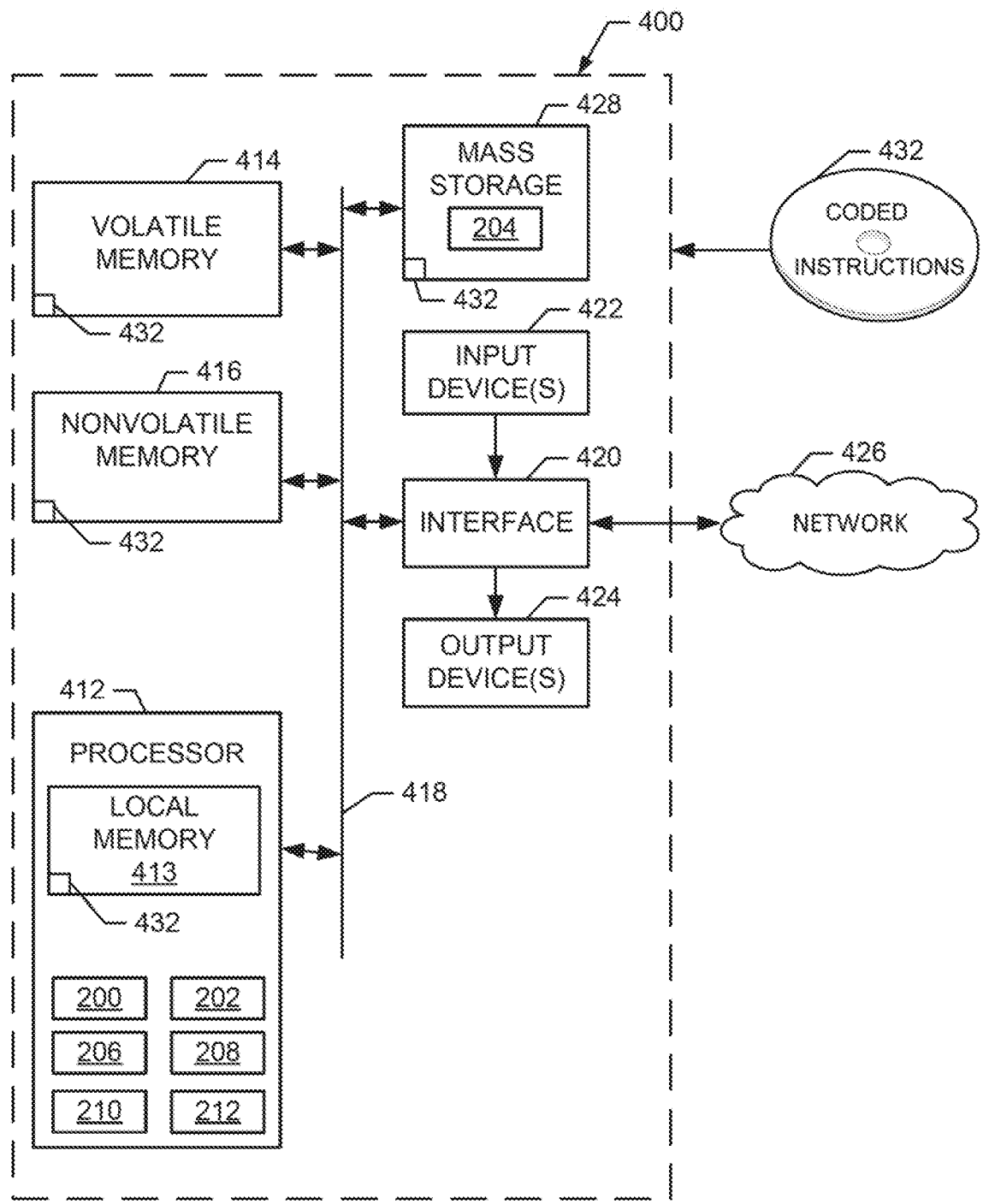
FIG. 4 is a block diagram of an example processing platform capable of executing the example machine-readable instructions of FIGS. 3A-3B to implement the example shadow upgrader of FIGS. 1 and/or 2.

At block 334, user interface 200 determines if the shadow environment should be deleted. The shadow environment may be deleted after the upgrade is performed based on user and/or manufacturer preferences. For example, a user may be prompted to delete the shadow environment after the report is generated and/or may set up an automated configuration that deletes the shadow environment after the report (e.g., a successful report) is generated. If user interface 200 determines that the shadow environment should be deleted (block 334: YES), topology FIG. 4 is a block diagram of an example processor platform 400 capable of executing the instructions of FIGS. 3A-3B to implement the example systems, operation, and management of FIGS. 1-4. Processor platform 400 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

Processor platform 400 of the illustrated example includes an example processor 412. Processor 412 of the illustrated example is hardware. For example, processor 412 can be implemented by one or more integrated circuits, logic circuits, microprocessors or controllers from any desired family or manufacturer. The hardware may be a semiconductor based (e.g., silicon based) device. In this example, the processor implements shadow upgrader 113, or portions thereof, such as user interface 200, setup scanner 202, database 204, setup configuration file generator 206, topology deployment determiner 208, upgrade coordinator 210, and/or report generator 212.

Processor 412 of the illustrated example includes a local memory 413 (e.g., a cache). Processor 412 of the illustrated example is in communication with a main memory including a volatile memory 414 and a non-volatile memory 416 via a bus 418. Volatile memory 414 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 416 may be implemented by flash memory and/or any other desired type of memory device. Access to main memory 414, 416 is controlled by a memory controller.

Processor platform 400 of the illustrated example also includes an interface circuit 420. Interface circuit 420 may be implemented by any type of interface standard, such as an Ethernet interface, a universal serial bus (USB), and/or a peripheral component interconnect (PCI) express interface.

In the illustrated example, one or more input devices 422 are connected to the interface circuit 420. Input device(s) 422 permit(s) a user to enter data and commands into processor 412. The input device(s) can be implemented by, for example, an audio sensor, a microphone, a keyboard, a button, a mouse, a touchscreen, a track-pad, a trackball, isopoint and/or a voice recognition system.

One or more output devices 424 are also connected to interface circuit 420 of the illustrated example. Output devices 424 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). Interface circuit 420 of the illustrated example, thus, typically includes a graphics driver card, a graphics driver chip or a graphics driver processor.

Interface circuit 420 of the illustrated example also includes a communication device such as a transmitter, a receiver, a transceiver, a modem and/or network interface card to facilitate exchange of data with external machines (e.g., computing devices of any kind) via a network 426 (e.g., an Ethernet connection, a digital subscriber line (DSL), a telephone line, coaxial cable, and/or a cellular telephone system).

Processor platform 400 of the illustrated example also includes one or more mass storage devices 428 for storing software and/or data. Examples of such mass storage devices 428 include database 204, flash devices, floppy disk drives, hard drive disks, optical compact disk (CD) drives, optical Blu-ray disk drives, RAID systems, and optical digital versatile disk (DVD) drives.

Coded instructions 432 representative of the example machine readable instructions of FIGS. 3A-3B may be stored in mass storage device 428, in volatile memory 414, in non-volatile memory 416, and/or on a removable tangible computer readable storage medium such as a CD or DVD.

From the foregoing, it will be appreciated that the above disclosed methods, apparatus and articles of manufacture generate a shadow setup based on a cloud environment and upgrade the shadow setup to identify upgrade-related errors in a live environment. Examples disclosed herein eliminate, or otherwise reduce, the risk of upgrade failures by generating and upgrading a replica shadow set corresponding to the live environment to check for upgrade errors. Using examples disclosed herein, a user, customer, and/or manufacturer can identify upgrade failures/errors based on the shadow setup and adjust the live environment and/or not perform the upgrade prior to upgrading the live environment, thereby eliminating the risk of upgrade failure in the live environment. Because a live environment may be ever changing (e.g., due to updates and/or changes in the live environment), examples disclosed herein generates a shadow setup based on the current state of the live environment to identify errors that may occur corresponding to a subsequent change/upgrade. Examples disclosed herein may be used to identify upgrade failures/errors corresponding to software upgrades, topology changes, configuration changes, and/or any other material change to a virtual server rack architecture, thereby ensuring that unexpected errors do not occur.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising at least one microprocessor, the apparatus configured to execute computer program instructions stored in a non-transitory machine readable memory, the instructions, when executed, to cause the apparatus to:

scan a cloud environment based on scanning rules to generate scanned data, the cloud environment including a number of computing components;

determine sampling criteria based on data from the cloud environment, the sampling criteria identifying a number of possible configurations of the computing components, the number of possible configurations being less than the number of the computing components;

generate a configuration file based on the sampling criteria and the scanned data, the configuration file corresponding to a replica of the cloud environment in which the replica includes the number of possible configurations of the computing components, the replica being a scaled down version of the cloud environment;

deploy a shadow setup based on the configuration file;

initiate an upgrade of one or more components of the shadow setup; and generate a report corresponding to a presence of errors associated with the upgrade.

2. The apparatus of claim 1, wherein the instructions further cause the apparatus to receive user input verifying the shadow setup prior to deploying the shadow setup.

3. The apparatus of claim 1, wherein the instructions causing the apparatus to deploy the shadow setup fixes errors encountered when deploying the shadow setup, the errors being fixed prior to the initiation of the upgrade.

4. The apparatus of claim 1, wherein the report includes data related to the errors encountered during the upgrade.

5. The apparatus of claim 1, wherein the instructions further cause the apparatus to generate a user interface, the user interface allowing a user to upgrade the one or more components in the cloud environment in a manner corresponding to the upgrade of the shadow setup.

6. The apparatus of claim 1, wherein the instructions further cause the apparatus to prevent or hinder a user from initiating an upgrade in the cloud environment when the errors are encountered during the upgrade of the one or more components of the shadow setup.

7. A method comprising:

scanning, by executing an instruction using a processor, a cloud environment based on scanning rules to generate scanned data, the cloud environment including a number of computing components;

determining, by executing an instruction using the processor, sampling criteria based on data from the cloud environment, the sampling criteria identifying a number of possible configurations of the computing components, the number of possible configurations being less than the number of the computing components;

generating, by executing an instruction using the processor, a configuration file based on the sampling criteria and the scanned data, the configuration file corresponding to a replica of the cloud environment in which the replica includes the number of possible configurations of the computing components, the replica being a scaled down version of the cloud environment;

deploying, by executing an instruction using the processor, a shadow setup based on the configuration file;

initiating, by executing an instruction using the processor, an upgrade of one or more components of the shadow setup; and generating, by executing an instruction using the processor, a report corresponding to a presence of errors associated with the upgrade.

8. The method of claim 7, further including receiving user input to verify the shadow setup prior deploying the shadow setup.

9. The method of claim 7, further including, when the deploying of the shadow setup causes an error, fixing the error prior to the initiating of the upgrade.

10. The method of claim 7, wherein the report includes data based on the errors encountered during the upgrade.

11. The method of claim 7, further including, when the report corresponds to a successful upgrade, receiving user input to initiate an upgrade of the one or more components in the cloud environment in a manner corresponding to the upgrade of the shadow setup.

12. The method of claim 7, further including preventing or hindering a user from initiating an upgrade in the cloud environment when the errors are encountered during the upgrade of the one or more components of the shadow setup.

13. A non-transitory computer readable storage medium comprising instructions which, when executed, cause a processor to at least:

scan a cloud environment based on scanning rules to generate scanned data, the cloud environment including a number of computing components;

determine sampling criteria based on data from the cloud environment, the sampling criteria identifying a number of possible configurations of the computing components, the number of possible configurations being less than the number of the computing components;

generate a configuration file based on the sampling criteria and the scanned data, the configuration file corresponding to a replica of the cloud environment in which the replica includes the number of possible configurations of the computing components, the replica being a scaled down version of the cloud environment;

deploy a shadow setup based on the configuration file;

initiate an upgrade of one or more components of the shadow setup; and generate a report corresponding to a presence of errors associated with the upgrade.

14. The non-transitory computer readable storage medium of claim 13, wherein the instructions cause the processor to receive user input to verify the shadow setup prior to deploying the shadow setup.

15. The non-transitory computer readable storage medium of claim 14, wherein the instructions cause the processor to, when the deploying of the shadow setup causes an error, fix the error prior to the initiation of the upgrade.

16. The non-transitory computer readable storage medium of claim 13, wherein the report includes data based on the errors encountered during the upgrade.

17. The non-transitory computer readable storage medium of claim 13, wherein the instructions cause the processor to, when the report corresponds to a successful upgrade, receive user input to initiate an upgrade of the one or more components in the cloud environment in a manner corresponding to the upgrade of the shadow setup.

18. The non-transitory computer readable storage medium of claim 13, wherein the instructions cause the processor to prevent or hinder a user from initiating an upgrade in the cloud environment when the errors are encountered during the upgrade of the one or more components of the shadow setup.

* * * * *